United States Patent
Dupuis et al.

(10) Patent No.: US 11,982,857 B2
(45) Date of Patent: May 14, 2024

(54) MILLED ROADWAY FEATURES FOR CABLE AND TAPE PATHWAYS

(71) Applicant: CORNING RESEARCH & DEVELOPMENT CORPORATION, Corning, NY (US)

(72) Inventors: David Montalion Dupuis, Cedar Park, TX (US); Cary Alan Kipke, Pflugerville, TX (US); Donald Kent Larson, Cedar Park, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 396 days.

(21) Appl. No.: 17/321,863

(22) Filed: May 17, 2021

(65) Prior Publication Data
US 2021/0271047 A1 Sep. 2, 2021

Related U.S. Application Data

(63) Continuation of application No. PCT/US2019/062170, filed on Nov. 19, 2019.
(Continued)

(51) Int. Cl.
*G02B 6/50* (2006.01)
*E01C 23/02* (2006.01)
(Continued)

(52) U.S. Cl.
CPC ............ *G02B 6/504* (2013.01); *E01C 23/025* (2013.01); *E01C 23/09* (2013.01); *E02F 5/10* (2013.01); *H02G 9/02* (2013.01); *E01C 23/0946* (2013.01)

(58) Field of Classification Search
CPC ........... G02B 6/504; H02G 9/02; E02F 5/101; E01C 23/09; E01C 23/0933
See application file for complete search history.

(56) References Cited

U.S. PATENT DOCUMENTS

| | | | |
|---|---|---|---|
| 6,371,691 | B1 | 4/2002 | Finzel et al. |
| 7,351,009 | B2 | 4/2008 | Serrano et al. |
| (Continued) | | | |

FOREIGN PATENT DOCUMENTS

| | | | |
|---|---|---|---|
| CA | 2438488 A1 | | 8/2002 |
| EP | 1741662 A1 | * | 1/2007 |
| WO | 2018/045404 A1 | | 3/2018 |

OTHER PUBLICATIONS

European Patent Application No. 19890957.4, Extended European Search Report, dated Jul. 19, 2022; 8 pages; European Patent Office.
(Continued)

*Primary Examiner* — Michael Stahl
(74) *Attorney, Agent, or Firm* — William D. Doyle

(57) ABSTRACT

A device for applying a distribution cabling tape system includes a distribution cabling tape having an adhesive capable of adhering to a concrete or asphalt substrate and a distribution cable. The device includes an endoscope camera, wherein movement of the device in one direction simultaneously applies both the distribution cable and the distribution cabling tape at a location on the substrate viewable by the endoscope camera. A method for registering a cable and a cabling tape into a channel in a concrete or asphalt substrate includes using an endoscope to view the location at which the cable and cabling tape are applied.

11 Claims, 8 Drawing Sheets

Related U.S. Application Data

(60) Provisional application No. 62/773,412, filed on Nov. 30, 2018.

(51) Int. Cl.
*E01C 23/09* (2006.01)
*E02F 5/10* (2006.01)
*H02G 9/02* (2006.01)

(56) References Cited

U.S. PATENT DOCUMENTS

| | | |
|---|---|---|
| 9,188,987 B2 | 11/2015 | Gustavsson et al. |
| 9,531,174 B2 | 12/2016 | Elford et al. |
| 2013/0011198 A1 | 1/2013 | Pichler et al. |
| 2013/0216313 A1 | 8/2013 | Gustavsson et al. |
| 2016/0223513 A1 | 8/2016 | Belangie |
| 2016/0356975 A1 | 12/2016 | Lish et al. |
| 2018/0017750 A1 | 1/2018 | Clatanoff et al. |
| 2019/0211527 A1* | 7/2019 | Dunst ............... E02F 5/12 |
| 2020/0227904 A1* | 7/2020 | Borer ............... H02G 9/025 |
| 2021/0271046 A1* | 9/2021 | Dupuis ............. G02B 6/504 |
| 2023/0117834 A1* | 4/2023 | Cole ............... G01B 21/18 |
| | | 404/94 |

OTHER PUBLICATIONS

International Search Report and Written Opinion of the International Searching Authority; PCT/US2019/062170; dated Mar. 30, 2020; 8 pages; European Patent Office.

* cited by examiner

MILLED ROADWAY FEATURES FOR CABLE AND TAPE PATHWAYS

CROSS-REFERENCE TO RELATED APPLICATIONS

This application is a continuation of International Application No. PCT/US2019/062170 filed on Nov. 19, 2019, which claims the benefit of priority under 35 U.S.C. § 119 of U.S. Provisional Application Ser. No. 62/773,412 filed on Nov. 30, 2018, the content of each of which is relied upon and incorporated herein by reference in their entirety.

BACKGROUND

For aerial deployments (telephone poles), deploying the fiber optic cable is relatively straight forward. Lashing the new fiber optic distribution cable to existing telephone cabling or stringing a new messenger wire in which to lash the new fiber optic cable is done relatively quickly (about a day to install the distribution cable for a serving area of 200-500 homes). However, for new entrants for fiber-to-the-home (FTTH) service, gaining access to the telephone poles from the pole owner (often incumbent telephone company) can be a time consuming and litigious process.

For below grade deployments (channel below grade in which to pull the distribution cable) deployment can involve many construction machines and operators for weeks for a serving area of 200-500 homes. One of the most time-consuming operations is directional drilling to place the channel below grade. The cost of directional drilling is approximately $40/foot making below grade fiber access network deployment cost much more than aerial deployments.

Therefore, a need exists for a distribution cabling alternative to traditional aerial and below grade installations that can eliminate the need to share telephone poles and avoid the time consuming and costly directional drilling for channel placement. One alternative is a distribution cabling tape system that comprises application of a polymeric cabling tape to a concrete or asphalt surface. The present disclosure is directed to a method for routing fiber optic cable(s) along a concrete or asphalt surface, such as a road or pavement. Conventional routing techniques provide for trenching the road or pavement, laying the cable into the trench, and covering the cable with material to fill and reseal the trench. Another technique involves laying the cable above the surface of the road by providing a cover (e.g., roadway tape) or incorporating the cable into a housing to protect from environmental or roadway hazards. These previous techniques have been shown to be susceptible to damage from numerous sources, including construction equipment and snow plows when the technique involves surface mounted cables systems, roadway damage from the impact of trenching, or cable damage due to cyclical expansion and contraction of the roadway or pavement material. An improved process for routing cable along a concrete or asphalt pathway is necessary that both protects the fiber optic cable and provides a viable solution for all climate regions and environmental conditions.

SUMMARY

A method of routing fiber optic cables along asphalt or concrete substrates, including roadways, parking lots, and walkways, involves the process of removing a portion of the asphalt/concrete surface to create a channel and then depositing the cable into the channel and securing with adhesive tape, sometimes referred to as cabling tape, pavement tape, or roadway tape.

The substrate surface is removed in specific locations using a process that may involve sequential steps or may be accomplished in a single operation. In the case involving sequential steps, the first removal process generates a channel, also referred to as a groove or slot, in the substrate. The channel dimensions are determined by the height and width dimensions of the fiber optic cable to be deposited within the channel. The second removal process generates a milled recess area distributed equally on both sides of the already milled channel. This milled recess area is shallower than the slot feature and is milled to ensure that the recess area accommodates the width of the road tape and is sufficiently deep to result in the tape surface being flush with the road surface or slightly recessed relative to the road surface. The milling and slotting process results in a "t-slot" feature and is conducted prior to introducing the cable and tape.

In accordance with other aspects of the present disclosure, a cable slot and road surface grind can be accomplished in a single step using a custom blade design. The blade design that generates the channel feature is a larger diameter than the blade design that generates the milled recess area. The larger diameter blade(s) are centered between the smaller diameter milling blades. This design allows the road to be simultaneously slotted and milled to provide the channel and recessed area in one pass.

In accordance with yet other aspects of the present disclosure, a process for introducing a fiber optic cable and cabling tape into a milled channel and recessed area includes lamination of the cable to the underside of the tape. The cable is laminated to a pressure sensitive adhesive on the underside of the tape and is centered relative to the width of the tape. Lamination of the tape to a substrate, such as a roadway or pavement, results in the cable being introduced into the channel due to the accurate positioning of the cable on the underside of the tape.

In accordance with yet other aspects of the present invention, the cable may be a flat drop style cable, for example, having a width that is greater than a height when viewed in cross-section. The cable can be positioned in the channel in either a horizontal orientation (flat) or a vertical orientation (on-edge). The cable may have one or more strength elements that combine with the geometry of the cable to create a preferential bend profile around a bend plane. The processes disclosed herein allow one to choose the orientation, horizontal or vertical, of the cable in the channel to accommodate preferential bend around bends in the road and/or at locations where the cable may be redirected toward a home or business from a roadway, for example.

The above summary of the present disclosure is not intended to describe each illustrated embodiment or every implementation of the present invention. The figures and the detailed description that follows more particularly exemplify these embodiments.

BRIEF DESCRIPTION OF THE DRAWINGS

The present disclosure will be further described with reference to the accompanying drawings, wherein.

Figure 1:
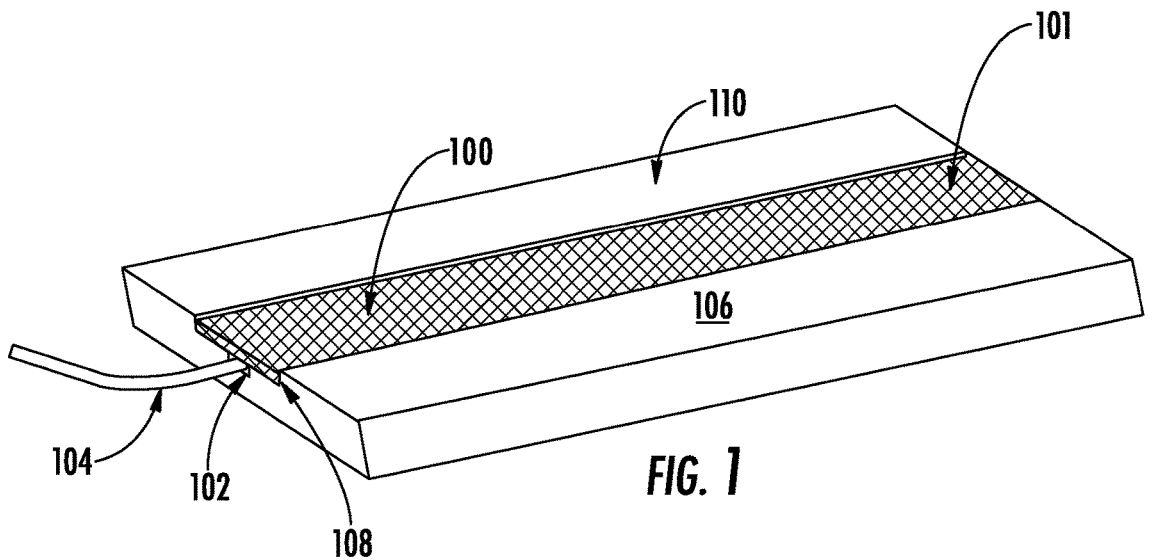
FIG. 1 illustrates a cabling tape and distribution cable as applied to a substrate surface, in accordance with aspects of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure.

FIG. 1 is directed to a durable, protective distribution cabling tape 100 that covers and protects a channel 102 into which a distribution cable 104 may be placed. The channel 102 may be in the form of a milled trench or groove feature in an asphalt or concrete substrate 106, although any suitable channel is contemplated, such as troughs or expansion joints between a roadway and a curb or sidewalk, for example, in which the channel 102 may not require separate milling to receive the distribution cable 104. The distribution cabling tape 100 is configured to adhere to the asphalt or concrete surface, such as a road, curb, walkway, bridge support, building base or other foundation.

In accordance with yet other aspects of the present disclosure, the substrate 106 may be formed with or milled to include a recessed area 108 that may be wider than a width of the channel 102, below the upper surface 110 of the substrate 106, and above a lower surface 103 of the channel 102. As such, the distribution cabling tape 100 may be formed to substantially occupy the recessed area 108 such that an exposed top surface 101 of the cabling tape 100 may sit substantially flush with or slightly below the upper surface 110 of the substrate 106.

The distribution cabling tape 100 may include an adhesive layer that is capable of adhering to the substrate 106, including the capability to adhere to a concrete or asphalt (or asphalt-concrete hybrid) surface, such as a road, curb or walkway surface, or any other suitable substrate surface, such as cobblestone or brick, for example. In accordance with other aspects of the present disclosure, in addition to or in lieu of an adhesive layer on the cabling tape, an adhesive compound, preferably a pressure sensitive adhesive compound, may be applied to the substrate 106 separately from the cabling tape 100 and the tape subsequently pressed into the adhesive for bonding to the substrate 106.

In accordance with other aspects of the present disclosure, the channel 102 may be adhesive free. In accordance with yet other aspects, the channel 102 may include some amount of adhesive to assist in holding the distribution cable in place during deployment and/or to provide a water sealant or water blocking material. The adhesive may be provided in the channel 102, throughout a full length of the channel 102, or at selective points or regions along the length of the channel 102. An exemplary sealant can comprise, for example, Safetrack™ MTI sealant available from StirlingLloyd Polychem Ltd (UK).

It is noted that while structures 100 are referred to herein as a "tape" or "system," this term is not meant to exclude other types of adhesive-coated structures, such as adhesive-coated road patches, panels or markers that can provide protection for optical fiber cable pathways. Although referred to herein primarily with respect to optical fiber cables, the distribution cabling tape can also be used to provide a protective pathway for electrical or power lines that are to be distributed through a neighborhood, or across a road, curb, street, parking lot or sidewalk, or for cabling repairs and/or splices. Moreover, the adhesive can be selected to provide either a temporary or more permanent type of bond to the road, curb, or walkway, thus providing a distribution cabling solution for short term events (such as concerts, sporting events, festivals, and the like), or for more longer duration deployment situations (such as subdivisions in development). In addition, while the tape embodiments described herein are often used in road, curb, sidewalk, or street applications, in alternative embodiments, the distribution cabling tape can be used to distribute cabling along other surfaces, such as along or up the side of a building, bridge, or other structures. Further, while cable 104 is described herein as a distribution cable, the disclosure contemplates routing and protection of many different types of cables or devices, including communication cables, power cables (such as low voltage power cables), sensor wires, co-axial cables, signal cables, and other conventional cables, or other types of equipment, such as sensors, RFID tags, embedded antennas, antenna feeds, and location markers.

Figure 2:
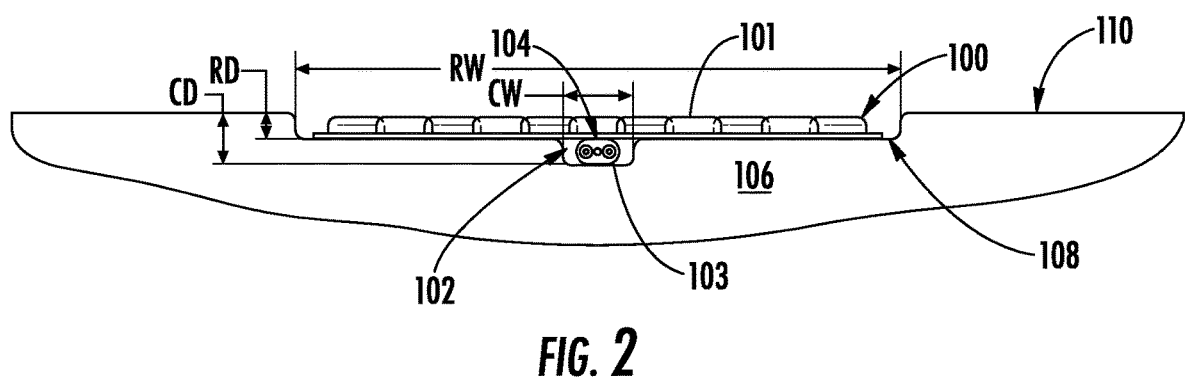
FIG. 2 illustrates one configuration of a cabling tape and distribution cable as applied to a substrate surface, in accordance with aspects of the present disclosure.
Figure 3:
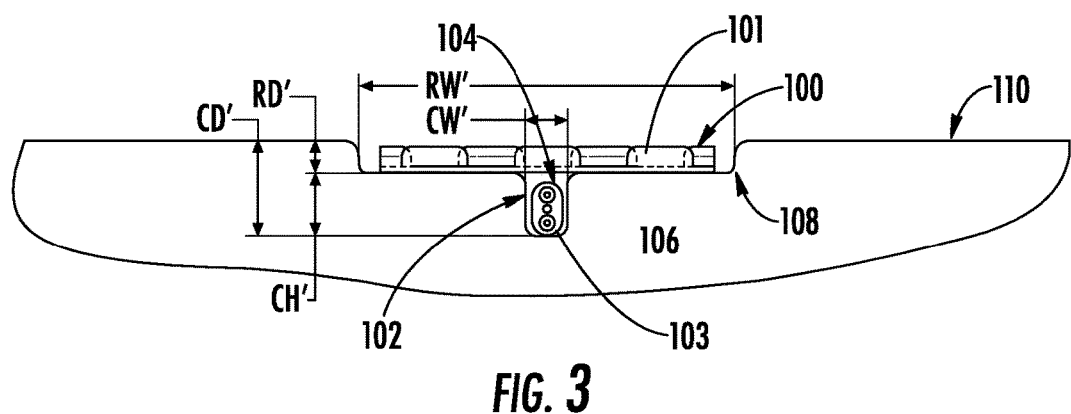
FIG. 3 illustrates another configuration of a cabling tape and distribution cable as applied to a substrate surface, in accordance with aspects of the present disclosure.

As shown in FIGS. 2 and 3, the 102 and recessed area 108 combine to define what may be referred to as a t-slot feature. The t-slot feature provides protection for both the fiber optic cable 104 and the protective cabling tape 100. The cable 104 is contained within a narrow channel that largely protects it from road surface impact. The tape 100 covers the cable and is laminated to the pavement within the milled recessed area 108. As shown again in FIGS. 2 and 3, the exposed top surface 101 of the tape sits flush with or slightly below the upper surface 110 of the substrate 106.

By recessing both the cable 104 and tape 100 into the road or pavement surface, the cable system disclosed herein has advantages over implementation of a surface mounted construction for routing cable above the pavement surface. Primary advantages include enhanced protection for the fiber optic cable 104, reduced vehicle contact with the cabling tape 100, and the ability to snow plow roads without dislodging the tape 100.

FIG. 2 shows a fiber optic cable 104 in a milled channel 104 covered by a road tape 104. The cable 104 is oriented in a horizontal position, relative to the substrate 106, and the tape 100 shown has a predetermined width. The profiles of the milled features are slightly wider than the profiles of both the cable and tape, respectively. For example, a recessed area width RW may be 4.25 inches if the tape 100 has a width of 4 inches, and a channel width CW may be 0.5 inches wide to accommodate many flat drop style cables in the market today. However, it should be noted that the milled features shown in FIG. 2 can be modified to accommodate additional cable(s) and that the tape width could be either wider or narrower. For example, RW may generally vary between 1 inch and 6 inches and CW may generally vary between 0.25 inches and 2 inches. In accordance with yet other aspects, the depth of the milled features may be designed to house the cable 104 within the channel 102 and ensure that the top surface of the tape 101 is either flush with or slightly lower than the upper surface 110 of the substrate 106. A depth of the channel CD as measured from the lower surface 103 to the upper surface 110 of the substrate 106 may be generally between 0.3 inches and 1 inch, and preferably about 0.35 inches for a typical ROC™ drop style cable provide by Corning Optical Communications, LLC, for example, and arranged horizontally as shown in FIG. 2. A depth of the recessed area RD as measured from a lower surface of the milled recessed area 108 to the upper surface 110 of the substrate 106 may be generally 0.1 inches to 0.5 inches, and preferably at least 0.2 inches to accommodate placement of the cabling tape 100 into the recessed area 108 so that the tape 100 sits flush or slightly below the upper surface 110.

FIG. 3 illustrates another configuration in which the profiles of the channel 102 and the recessed area 108 are slightly different to accommodate the different orientation of the cable 104. The cable 104 is oriented in a vertical position, relative to the road. The profiles of the milled features are slightly wider than the profiles of both the cable and tape, respectively. For example, the recessed area width RW' may be 2.25 inches if the tape 100 shown in FIG. 3 has a width of 2 inches, and a channel width CW' may only be 0.25 inches to accommodate the narrower profile of the vertically oriented cable. However, it should be noted that the milled features shown in FIG. 3 can be modified to accommodate additional cable(s) and that the tape width could be either wider or narrower. For example, RW' may generally vary between 1 inch and 6 inches and CW' may generally vary between 0.1 inches and 1 inch. In accordance with yet other aspects, the depth of the milled features may be designed to house the vertically oriented cable 104 within the channel 102 and ensure that the top surface of the tape 101 is either flush with or slightly lower than the upper surface 110 of the substrate 106. A depth of the channel CD' as measured from the lower surface 103 to the upper surface 110 of the substrate 106 may be generally between 0.3 inches and 1 inch, and preferably about 0.55 inches for a typical ROC™ drop style cable provide by Corning Optical Communications, LLC, for example, and arranged vertically as shown in FIG. 3. A depth of the recessed area RD' as measured from a lower surface of the milled recessed area 108 to the upper surface 110 of the substrate 106 may be generally 0.1 inches to 0.5 inches, and preferably at least 0.2 inches to accommodate placement of the cabling tape 100 into the recessed area 108 so that the tape 100 sits flush or slightly below the upper surface 110.

There are numerous options for creating the channel 102 in the substrate 106, ranging from small manually operated saws to large semi-automated equipment, such as that manufactured by Ditch Witch. One drawback to manually operated saws is the width of the slot/groove that can be created with a single cut. The largest blade width is approximately ⅜ inch and provides a channel width that is generally too narrow for containment of an outdoor rated fiber optic cable (½ inch width). Large scale semi-automated equipment is designed to cut a wide pavement channel. However, the scale of the operation in a neighborhood setting may dictate the scale of equipment that is acceptable based on noise, disruption, scale and cost. Manually operated milling machines are available but are laborious to operate over long distances.

Figure 4:
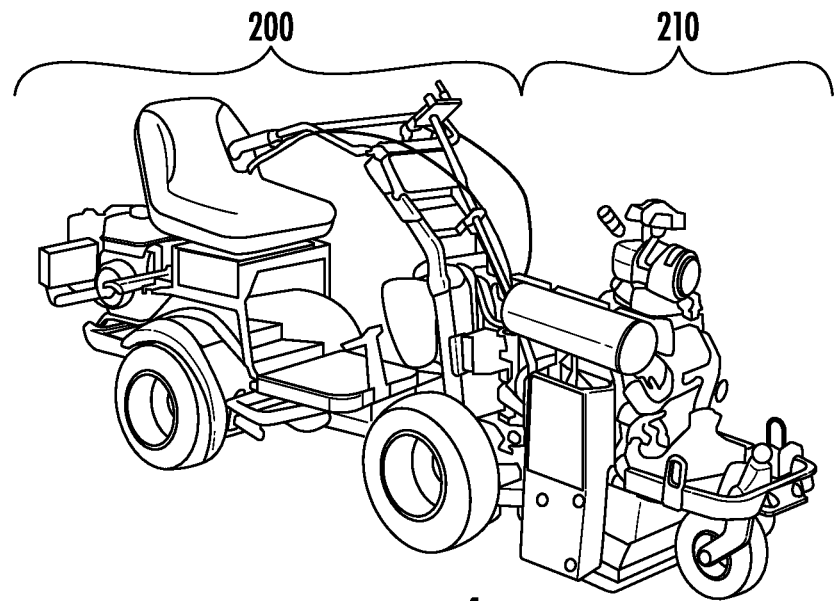
FIG. 4 shows a motorized driver and pavement grinder in accordance with aspects of the present disclosure.

An attractive option for routing fiber optic cable in residential areas and parking lots is to utilize a motorized system with a small foot-print. This option minimizes the need for manual labor and reduces the size and noise of grinders on a large truck. An example of such a system is the combination of a motorized driver 200, such as a Graco Line Driver, with a pavement grinder 210, such as a Graco GrindLazer, as shown in FIG. 4. The pavement grinder may be equipped with diamond blades 230 (see FIG. 5 that can slot or mill a pavement surface to a desired width and depth. The desired width and depth of the slot or milled feature is dependent on the characteristics of both the cable dimensions and pavement tape dimensions, respectively, as discussed above. Based on the width and height dimensions of the tape, the substrate on one or both sides of the slot or channel 102 may be ground to ensure that the tape 100 can be positioned within the width of the recessed area 108 created as a result of the grind and that the depth of the recessed area 108 is sufficient to enable the tape 100 to be flush with the road surface or recessed with respect to the road surface.

Aspects of the methods and apparatus disclosed herein provide for generating either one of the channel 102 or the recessed area 108 around the channel. In accordance with aspects of one embodiment, a sequential process may be used to accomplish both tasks. The sequential process involves generating a slot feature or channel in the road followed by a process that generates a milled recessed area distributed equally on both sides of the channel. In accordance with aspects of another embodiment, both tasks may be accomplished in a single pass or a one-step process. The one-step process simultaneously generates both the channel and the milled recessed area that is distributed equally on both sides of the channel.

Sequential Process: 1. Slotting the Substrate Surface to Create the Channel

Figure 5:
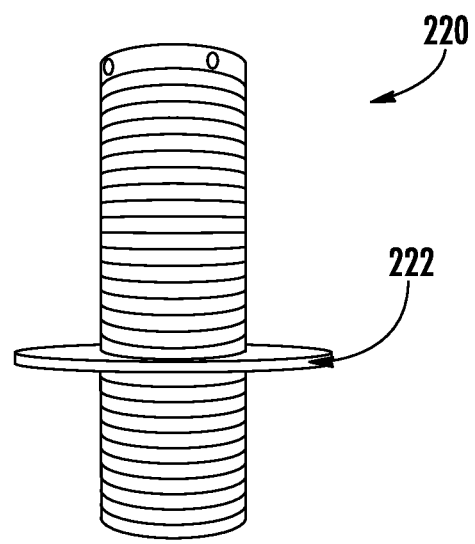
FIG. 5 illustrates a diamond tipped blade in accordance with aspects of the present disclosure.

The initial removal process generates a groove/slot in the road surface. The desired dimensions of the slot feature are determined by the height and width dimensions of the fiber optic cable 104 that will be deposited within the slot. FIG. 5 shows a diamond tipped blade configuration 220 that may be mounted on the pavement grinder 210, such as a Graco GrindLazer, to initially create the channel 102 in the substrate 106. A diamond tipped blade 222 is selected based on the width and diameter needed for creating the proper channel width and depth to accommodate the cable 104.

Sequential Process: 2. Milling the Substrate Surface to Create the Recessed Area The milled recessed area 108 is shallower than the channel 102 and is milled to a profile that ensures the width of the road tape 100 will be accommodated and that the depth of the recessed area is sufficient to result in the tape surface 101 being flush with an upper surface 110 of the substrate slightly recessed relative to the upper surface 110. It is desirable for the milled surface to be equally positioned on both sides of the slot feature to ensure that the road tape has consistent adhesive contact with the substrate material on both sides of the channel.

Figure 6:
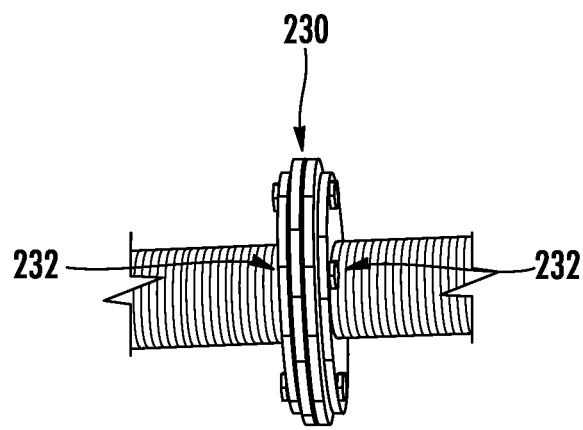
FIG. 6 illustrates a slot guide wheel and milling blade configuration in accordance with aspects of the present disclosure.
Figure 7:
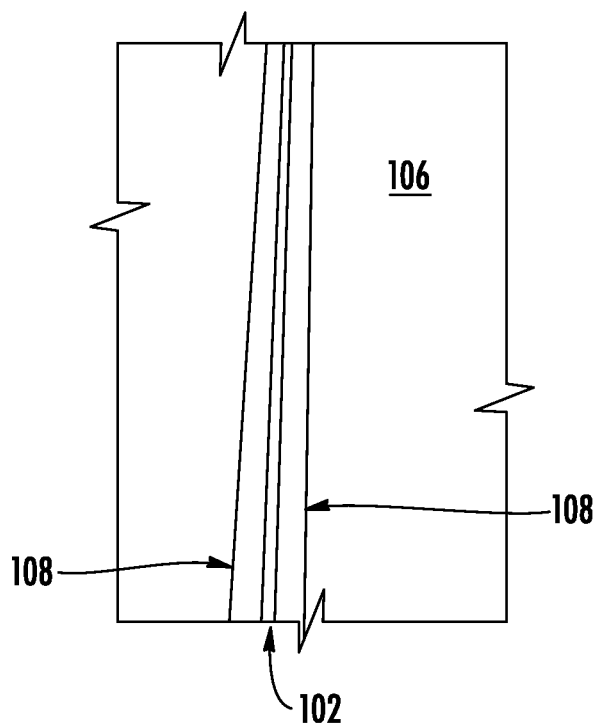
FIG. 7 illustrates a channel and recessed area feature as milled into a substrate in accordance with aspects of the present disclosure.

It is unrealistic to expect an operator to accurately and reliably mill the road surface using a semi-automated machine without some type of guidance system. In accordance with aspects of the present disclosure, and as shown in FIG. 6, the pavement grinder 210 may be provided with a slot guide wheel 230 between left-side and right-side milling blades 232. The guide wheel 230 has a diameter that is larger than the milling blades 232 and a width that allows the wheel to fit within the channel 102. This configuration provides the operator with a built-in mechanism for accurately following the channel 102 during milling and results in a milled recessed area 108 that is symmetrical on either side of the channel 102, as shown in FIG. 7. The pavement grinder with slot guide wheel to guide the milling process may accurately follow a 25-foot radius of curvature during the milling process. The result of this sequential process is the t-slot feature comprising the channel 102 and the recessed area 108 shown, for example, in FIGS. 1-3.

One-step Process: Simultaneous Slotting and Milling the Pavement

Figure 8A:
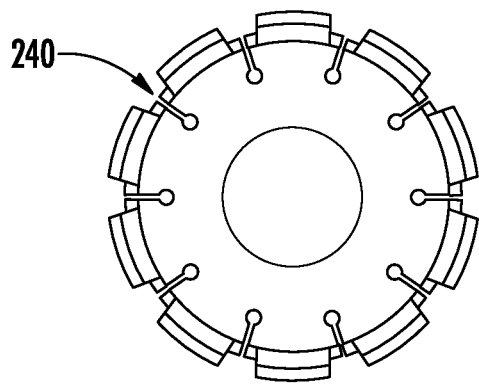
FIGS. 8A illustrates a channel blade in accordance with aspects of the present disclosure.
Figure 8B:
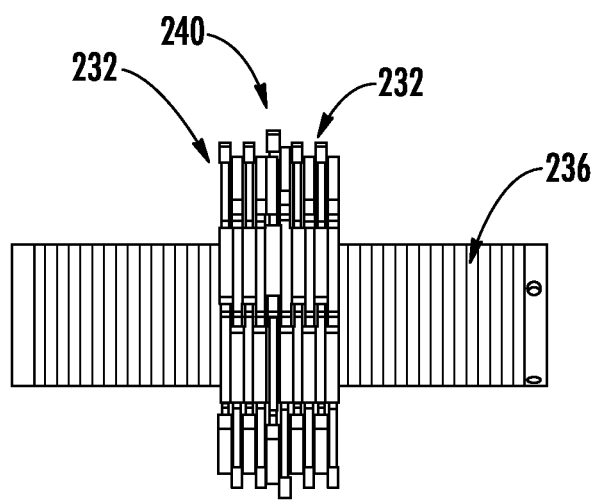
FIG. 8B illustrates a channel blade and milling blade configuration on an axle housing in accordance with aspects of the present disclosure.

In accordance with aspects of the present disclosure, a special blade may be used with the pavement grinder 210 to provide a one-pass solution for simultaneously milling both the channel 102 and the recessed area 108 on either side the channel. As shown in FIGS. 8A and 8B, a special blade configuration may involve mounting onto a blade axle 236 at least one diamond tipped channel blade 240. The diamond tipped channel blade 240 is centered on the axle housing 236 and at least one milling blade 232 is mounted on the housing 236 at each side of the center blade 240. FIG. 8A shows a rendering of the channel blade 240. FIG. 8B illustrates a configuration in which two channel blades 240 are centrally mounted on the axle housing 236, four milling blades 232 are mounted directly on one side of the channel blades 240, and four milling blades 232 are mounted on the other side of channel blades 240. The blades 232, 240 fit securely on the housing 236 and the channel blades 240 have a larger diameter than the milling blades 232. The diameter of the channel blades 240, relative to the milling blades 232, will provide the predetermined depth profile of the channel 102 in relation to the grind profile of the recessed area 108. The number of channel blades 240 used for the channel 102 is dictated by the dimensions of the cable 104 and the orientation of the cable 104 in the channel 102. The number of milling blades 232 used for the recessed area 108 will be dependent upon the width of the cabling tape 100.

It is desirable to maximize the protection of both the cable 104 and tape 100 in the road surface. The depth profile of the channel and milled recessed areas may be adjusted during milling. The width of the channel and milled recessed areas are controlled by the blade assemblies. It is important that the cable 104 fits entirely within the milled channel and that the upper surface of the tape is flush with the surface of the road or slightly below the surface of the road. The depth of the milled road recess has a large impact on the contact with vehicle tires. This has a large effect on both the durability and lifetime of the tape. Testing of the tape durability on a tape having a 1 inch width was conducted by positioning a Ford F-150 tire directly on the installed tape having a thickness slightly less than 0.20 inches and conducting a stationary tire turn. Asphalt surface that was milled to a depth of 0.20 inches resulted in no damage to the laminated tape. Slight damage was observed for the tape laminated at a depth of 0.18 inches, whereas the tapes laminated in a recess depth of 0.17 inches and 0.15 inches sustained considerable damage.

In accordance with various aspects of the present disclosure, it has been observed that the width and texture of the recessed tape may impact the ability to withstand a stationary tire turn. As the tape becomes wider (e.g., 4 inches or greater) even a recessed depth of 0.20 inches may not be sufficient to protect the tape due to increased surface contact with the tire tread. In addition, various surface textures, preferably a smooth surface finish, also may assist in improving long term performance of the tape.

Figure 9:
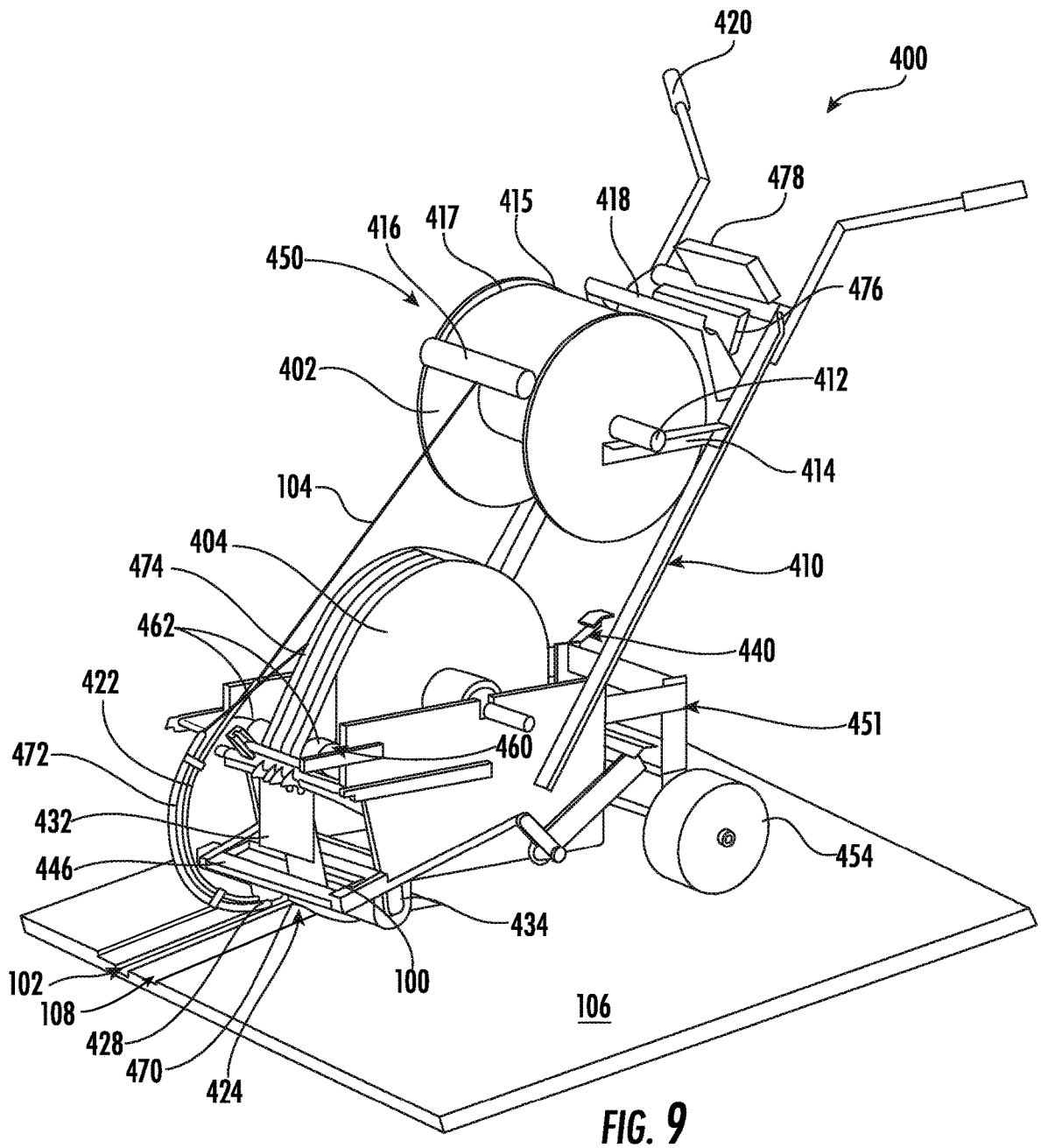
FIG. 9 is a view of device for applying a distribution cabling tape and distribution cable in accordance with aspects of the present disclosure.

As shown in FIG. 9, with the channel 102 and recessed area 108 milled in the substrate 106, an automated cable and tape applicator device 400 may be used for lamination of the cable 104 and tape 100 to the substrate 106. As shown in FIG. 9, the distribution cable 104 and the distribution cabling tape 100 can be applied to the substrate 106 using an applicator machine or device 400. Although shown with respect to cabling tape 100 and a uniform channel 102 and recessed area 108, the methods and apparatus disclosed may use any suitable cabling tape.

Device 400 can simultaneously apply both distribution cable 104 and the road tape 100 in a single pass. By pushing the device 400 forward, a continuous cable and tape payout and lamination process can occur. In addition, device 400 can be configured with a single front wheel that helps allow for turning during the application process, so that a turning radius down to at least 6 feet can be achieved. In addition, device 400 can be manually operated using a manual pushing force or it can be a motor assisted or driven device.

The device 400 includes a cabling tape housing and distribution portion 404 that houses a spool of distribution cabling tape 100. The device 400 also includes a distribution cable housing and distribution portion 450 that houses a cable spool 402, which may preferably provide a predetermined length of an optical fiber cable 104, for example.

In this example, the cable spool 402 may be mounted onto frame 410 by a cable spool support rod 412 removably supported by arms 414 and low friction bushings (not shown). Cable spools 402 of about 2000 feet or more may be easily mounted onto the device 400. By locating the cable spool 402 on frame 410 above the cabling tape housing and distribution portion 404, the footprint of the device 400 may be more compact than if cable spool 402 and cabling tape housing and distribution portion 404 are situated horizontally one behind the other.

In accordance with other aspects of the disclosure, the cable 104 may be fed to device 400 from a separate storage location or apparatus. For example, a separate spool holder (not shown), which for example may be a cart or trailer, may be attached to the device 400 or incorporated into or attached to the motorized attachment 452 to supply longer lengths of cable 104 than can be effectively held by the device 400. Other aspects may include laying the cable ahead of device 400, wherein the cable 104 is fed to the device 400 from forward of the device 400. Serpentine rollers or any other suitable guide mechanisms to feed the cable 104 toward the cable placement area 424 may be provided on the frame 410.

Device 400 may also include a cable holding mechanism 415, such as a weight bar 416 and plastic mesh 417, which may be a spring-loaded netting, for example. The distribution or drop cable 104 may be stiff or shape-conformed due to spooling, which may snag if not maintained in position with compression and/or tension. Accordingly, the cable holding mechanism 415 provides a mean of maintaining a relative position of the cable 104 during unspooling to provide a constant force on the cable 104 so that distribution cable does not inadvertently deploy. The frame 410 may include a holding mechanism support 418. The weight bar 416 and mesh 417 may be lifted and moved to a location supported by the holding mechanism support 418 to allow for rapid spool 402 changes.

Handle bars 420 may be incorporated into the frame 410 or separately provided to attach to the frame 410. Handle bars 420 may extend outward at an angle, such as about 45°, to provide greater leverage to an operator to turn and steer the machine, avoiding operator fatigue. In addition, the positioning and angle of the handle bars 420 are such that during operation, when the device 400 is attached to a motorized guide vehicle, the ergonomics of the handle bars ensure the operator may remain seated comfortably and operate the device 400 without strain or discomfort.

Figure 10:
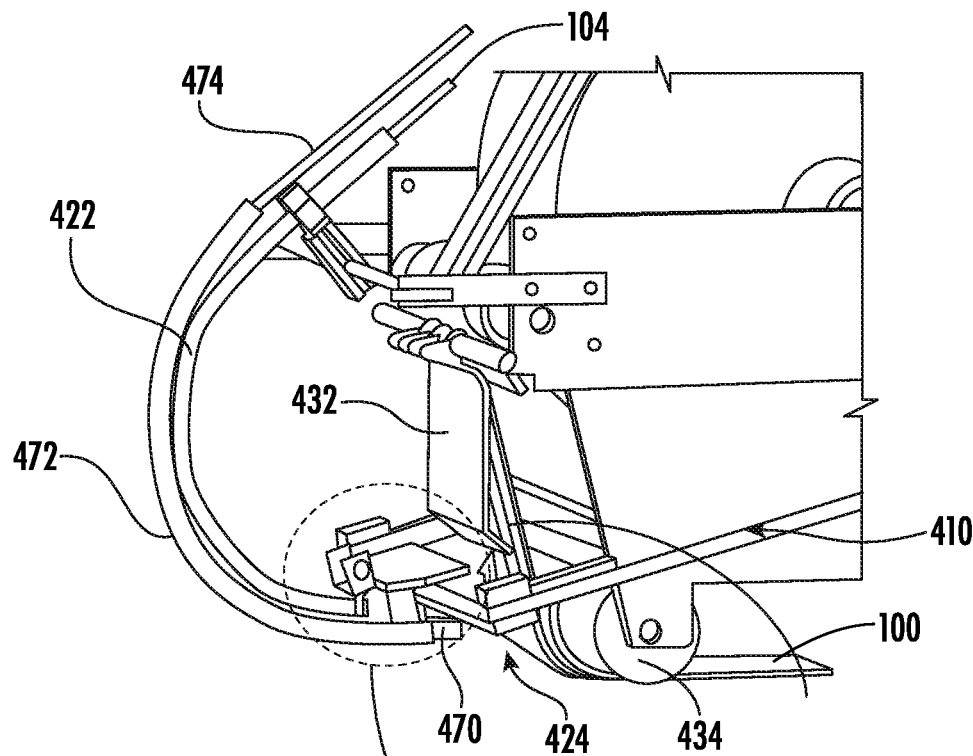
FIG. 10 is a sectional view of a front portion of the device shown in FIG. 9.
Figure 11:
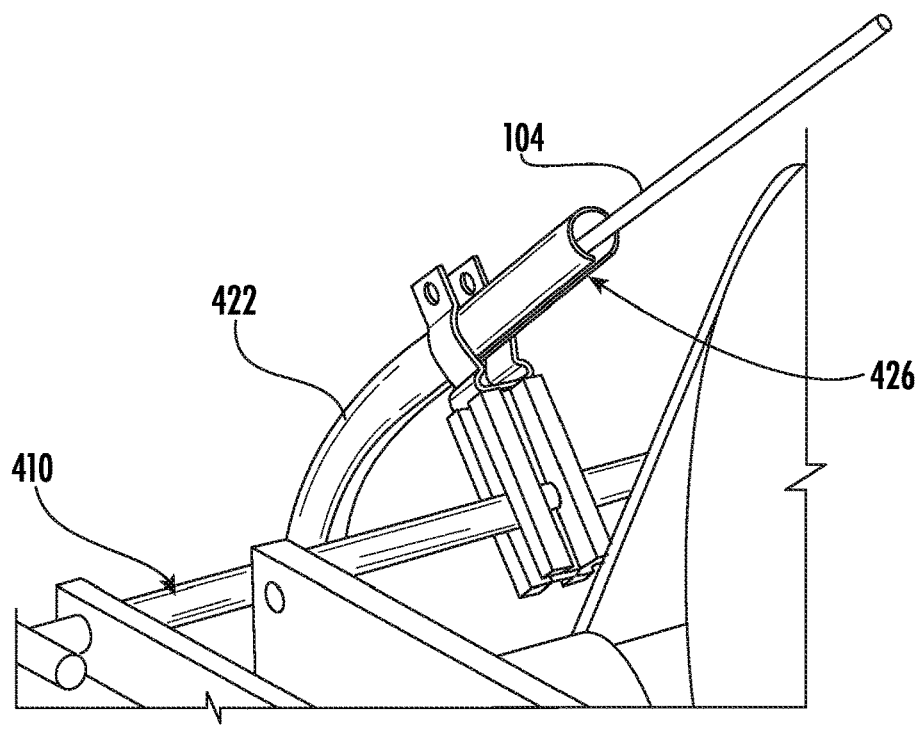
FIG. 11 is a close-up sectional view of aspects of the device shown in FIG. 9, including a cable guide, in accordance with aspects of the disclosure.

As shown in FIGS. 9 through 11, the distribution cable 104 may be fed from the spool 402 into a cable guide 422 to change the direction of the cable with low friction as the cable 104 is paid out from the cable spool 402 toward the cable placement area 424. The cable guide 422 may be a tube, for example, made of metal, a hard polymer, or any other suitable material that is removably attached to the frame 410. The cable guide 422 constrains and guides the cable 104 for efficient and consistent placement toward the cable placement area 424. As shown in FIG. 11, the cable guide 422 may be formed to include a longitudinal gap 426 that allows the cable 104 to be removed from the device 400 without having to cut the cable 104 to do so. Although shown with the longitudinal gap 426 provided on an inner radial surface of the cable guide 422, the longitudinal gap 426 may be provided longitudinal along any side of the cable guide 422, such as the radial outer surface of the cable guide 422 or either longitudinal side surface of the cable guide 422. Particularly at transition from cabling distribution tape 100 to a drop cable burial, for example, it is desirable to remove the cable spool 402 from the machine without cutting the cable 104. The longitudinal gap 426 allows the cable 104 to be removed from the device 400 without having to cut the cable. In this regard, the cable 104 may be removed from device 400 and a slack amount of cable 104 for a drop, for example, may be run off the spool 402 before a cut is made in the cable.

Figure 10A:
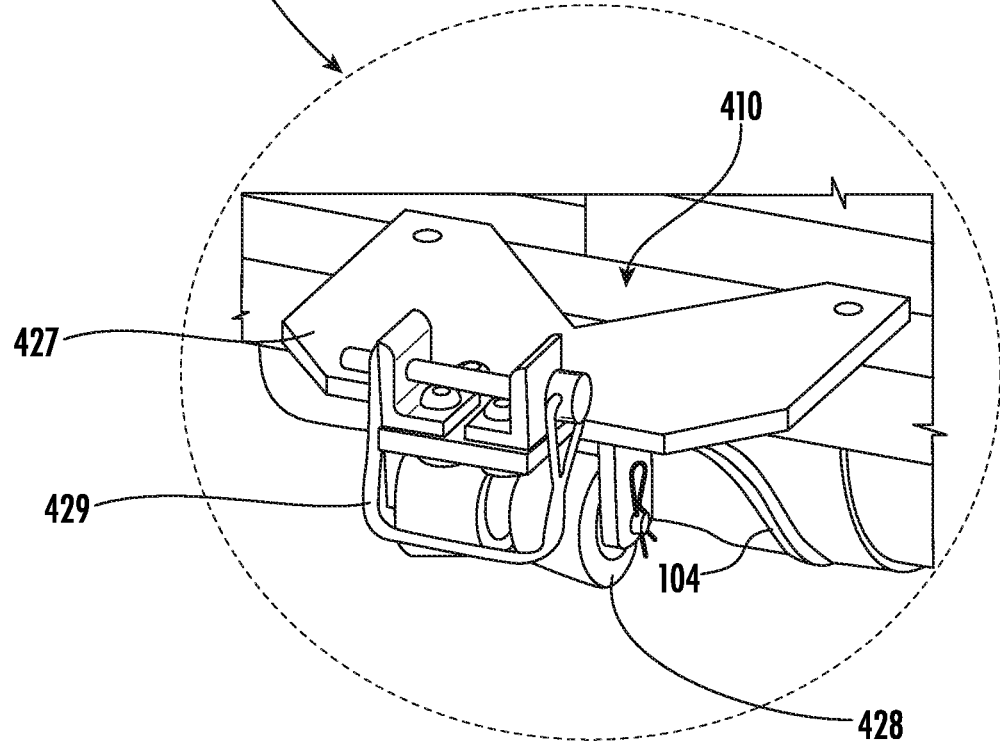
FIG. 10A is a close-up view of cable guide components in accordance with aspects of the present disclosure.

A guide roller 428 may be provided to further direct the cable 104 efficiently toward the cable placement area 424 once the cable exits the cable guide 422. In accordance with yet other aspects of the present disclosure, as shown in the close-up of FIG. 10A, a front guide plate 427 may be incorporated into or attached to the frame 410 to support the guide roller 428 and further assist in directing the cable 104 toward the cable placement area 424. As shown in FIG. 10A, the guide roller 428 may be removable and may comprise two compressible roller portions and a central slot for guiding the cable, or may be formed of a single body portion containing a central groove or valley for guiding the cable 104 toward the cable placement area 424. Different guide rollers 428, for example, with different sized slots or valleys, may be used to accommodate different sized cables. A removable arm bar 429 may be mounted onto the front guide plate to further constrain and guide the cable 104 toward the cable placement area 424.

In accordance with other aspects of the disclosure, a tape feed mechanism 432 may be provided that is integral with or attached to a leading edge of the cabling tape housing and distribution portion 404. The tape feed mechanism 432 may be retractable such that when loading a new tape reel, or when a cut has been made in the tape 100, the tape feed mechanism 432 may be extended to allow the tape 100 to be pulled from a forward exit portion of the cabling tape housing and distribution portion 404 without the adhesive from the tape sticking to or gumming up aspects of the cable tape housing and distribution portion 404, the frame 410, or other components of the device 400 until the end portion of the tape 100 is attached to the road surface 106. The tape feed mechanism 432 may be provided with a low friction coating, such as Teflon or some other suitable material, for example, to provide the necessary protection without the tape sticking to the tape feed mechanism.

In accordance with yet other aspects of the present disclosure, the tape feed mechanism 432 may be provided with a coating or other mechanical means to provide a controlled bond to the tape 100, such that the tape feed mechanism 432 may be attached at or toward a distal end or tongue portion of the tape 100 where the distal end or tongue portion of the tape 100 exits the cabling tape housing and distribution portion 404. The tape 100 may be extended from the road tape housing and distribution portion 404 until the tape 100 is positioned for attachment to the substrate 106 just prior to the primary roller 434. Upon proper positioning, the tape feed mechanism 432 may be released or detached from the end of the tape 100 and the end of the tape attached to the substrate 106. Once the end of the tape 100 is attached to the road surface 106, the tape feed mechanism 432 may be retracted or stored separated from the tape 100 now traversing past the tape feed mechanism 432 as the cable 104 and tape 100 are paid out.

As shown in FIG. 9 and closeup in FIG. 11, the device 400 may be provided with a cut apparatus 440 that extends from the frame 410 toward the rear of the device 400. The cut apparatus 440 is situated to a side of a motorized attachment frame 451 provided toward a rear portion of the device 400. Thus, when a motorized attachment, such as Graco Line Driver HD Model 262005, is used with the device 400, the cut arm apparatus 440 clears the motorized attachment 452. The cut apparatus 440 includes a cut arm 440 attached to a linkage system 444. The cut arm 442 is cantilevered toward the rear of the device 400 such that an operator walking behind or an operator of a motorized attachment attached to the device 400 can easily apply pressure with a foot, for example, to the cut arm 442. The cut arm 442 will in turn operate a cut blade 446 (see FIG. 3) through the linkage system 444 that cuts the tape 100 when desired.

In accordance with yet other aspects of the present disclosure, as shown in FIG. 11, the device 400 may include wheels 454 mounted on the attachment frame 451. Combined with the primary roller 434, the device 400 is mobile during simultaneous application of the distribution cable 104 and the cabling tape 100. The device 400 may be weighted such that the primary roller 434 applies pressure to the cabling tape 100 to bond the cabling tape 100 to the substrate 106 during application. A secondary weight component may be used to further compress the roadway tape 100 into the substrate 106 following application by the device 400. As shown in FIG. 9, a tape roll idler 460 having integrated tape edge guides 462 may be mounted onto the frame 410. The tape edge guides 462 have an outside diameter that ensures the tape 100 is properly situated between the guides 462 does not jump or substantially move during installation.

A hitch component, not shown, may be integral with or attached to the attachment frame 451 such that a motorized attachment may be easily attached to and used with the device 400. The device 400 may thus be pushed by the motorized attachment to reduce or eliminate operator fatigue. Moreover, due to the weight and friction of the device 400 while placing tape 100 and cable 104, considerable axial force is required to move the device 400 forward during operation. Particularly where longer applications are required, use of the motorized attachment may be desirable.

As shown in FIGS. 9 and 10, the cable 104 may be directed either toward the road surface 106 or directly onto the tape 100. The cable 104 may thus be accurately placed onto the road or directly onto the tape 100 such that the cable 104 situates into the center channel 102 of the substrate 106, including in situations wherein the device 400 is making radius turns on the surface of the substrate 106 as low as 10 feet. This allows efficient placement of the distribution cable 104 and road tape 100 around street corners or road obstacles such as manhole covers, for example, without having to stop or reset the device 400.

Figure 12:
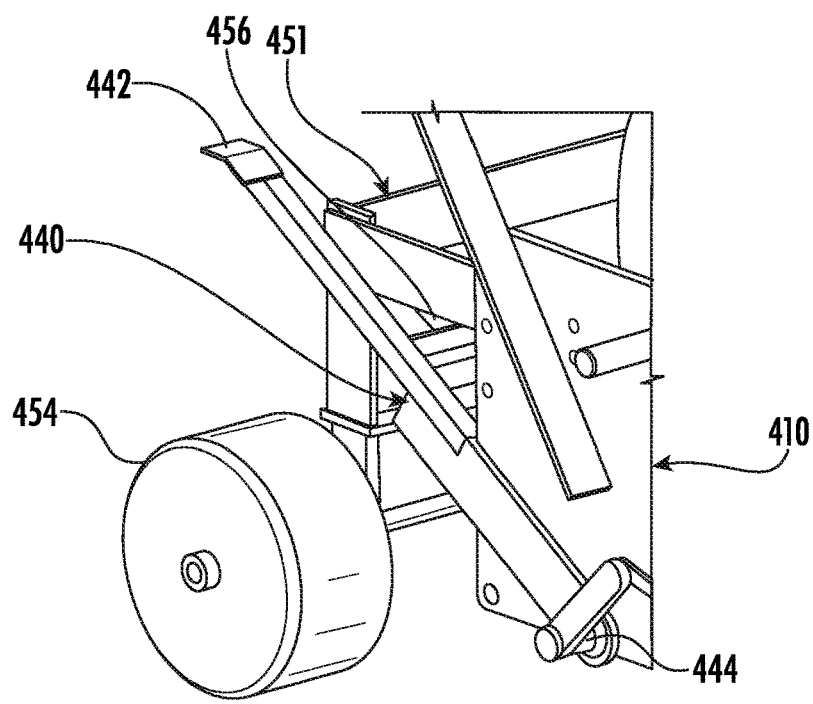
FIG. 12 is a close-up sectional view of more aspects of the device shown in FIG. 9, including a cut apparatus, in accordance with aspects of the disclosure.

Because of the configuration of device 400, the machine operator may have an obstructed view of the cable placement area 424 and/or the channel 102 in the substrate 106, for example. In accordance with yet other aspects, as shown in FIG. 9, an endoscope camera 470 may be provided to enable an operator of the device 400 to more easily view the cable placement area 424 during use. The endoscope camera 470 may be positioned to extend from a distal end of an endoscope routing tube 472 (see also FIGS. 10 and 12). The endoscope routing tube 472 may be permanently or removably attached to the cable guide 422, for example, or mounted directly to a portion of the frame 410. An endoscope cable 474 can be seen entering the top of the endoscope routing tube 472. The endoscope cable 474 connects the camera 470 to a power source and controller 476. Configured as such, the endoscope camera 470 is oriented to provide a direct view of the cable 104 and cabling tape 130 on the primary roller 434 as well as a view of the substrate 106. As shown in FIG. 12, the endoscope camera 470 may be provided with a visibility enhancement feature 471, such as a ring of LED lights surrounding the camera 470 that can be adjusted for brightness.

Figure 13:
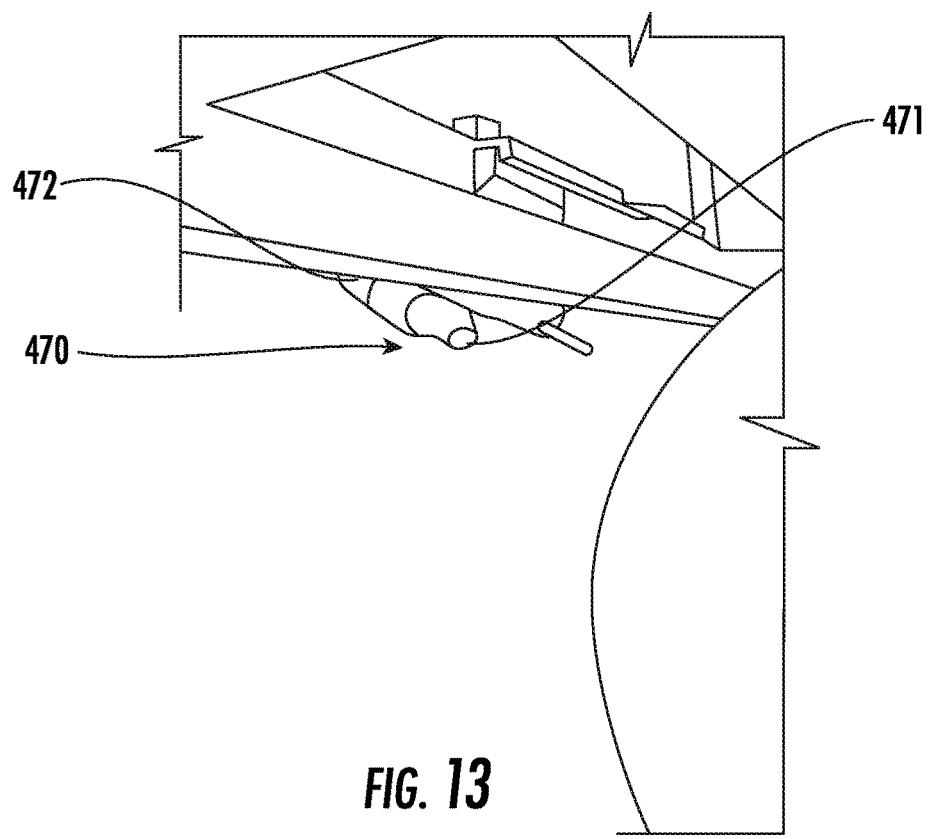
FIG. 13 is a close-up sectional view of aspects of the device shown in FIG. 9, including an endoscope camera, in accordance with aspects of the disclosure.
Figure 14:
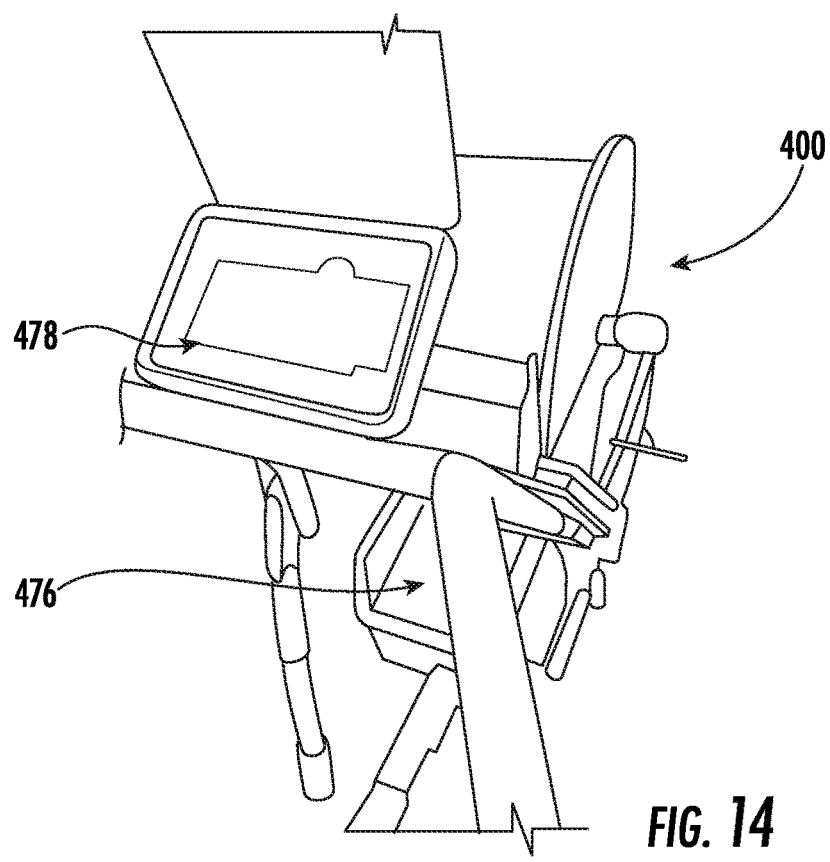
FIG. 14 is a close-up sectional view of aspects of the device shown in FIG. 9, including an endoscope control unit and user interface, in accordance with aspects of the disclosure.

As shown in FIG. 13, the endoscope camera 470 may be directly connected to a user interface 478 that may be mounted on the handle bars 420, for example. The user interface 478 may be a cell phone, for example, that can be used to view the images and control the endoscope camera 470 and any related features through a software application. For example, the user interface may be used to easily modify the viewing angle/distance of the camera 470 during operation of the device 400. The user interface 478 may connect to the controller 476 via WiFi or Bluetooth for example.

The endoscope camera 470 provides an operator the ability to accurately and efficiently ensure placement of the cable 104 into the channel 102 and/or application of the cabling tape 100 into the recessed area 108 (see, e.g., FIG. 1). The ability to easily position the camera into a variety of positions and to control the image display using a standard cellular phone makes this a versatile tool for an operator. The endoscope also possesses the advantages of simplicity and requires minimal space toward the front of the device 400.

An example of a wireless endoscope camera 470 is the Depstech 1200P Semi-Rigid Wireless Endoscope. The camera provides a 16-inch focal distance and is equipped with a 33-foot snake cable. Image viewing is enabled by WiFi for both Android and IOS Smart Phone tablet.

An operator may want to change the viewing aspect of the camera image depending on the task. Registering the cabling tape 100 and cable 104 into the channel 102 and/or recessed area 108 of the substrate 106 that is substantially straight (no curves) may only require visualization directly in front of the primary roller 434. When registering the cabling tape 100 and cable 104 into the channel 102 and/or recessed area 108 of the substrate 106 with a radius turn it may be desirable to expand the camera angle so that there is a greater viewing distance in front of the primary roller 434. This allows the operator to react to the direction change and steer the applicator appropriately.

It is beneficial to have the camera 470 positioned so that a single point of reference can be used to register the cabling tape 100 and cable 104 within the channel 102 and/or recessed area 108 of the substrate 106. In accordance with aspects of the present disclosure, the point of reference could be the recessed slot or channel 102 for housing the cable 104 or one edge of the grinded recessed area of the substrate for alignment with the tape 100. We approximate that the allowed variation required for the laminator to place the cable and tape to the milled grooves in the road is +/−0.125 inches.

Alternative techniques can be considered for accurate placement of the cable and tape using the motorized applicator 400. Physical optics such as lenses and mirror combinations are useful across many industries to view challenging locations. A periscope would allow viewing in the target region, yet it would require several sets of aligned optics. A convex mirror placed in front of the primary roller would require a second mirror to view around the cable spool. These options have the benefit of no electronics or power required.

While a preferred application of the distribution cabling tape is for telecommunication applications, as mentioned previously, other applications can include pathways for power, sensors or sensing or electronics for smart road applications.

Various modifications, equivalent processes, as well as numerous structures to which the present disclosure may be applicable will be readily apparent to those of skill in the art to which the present disclosure is directed upon review of the present specification.

We claim:

1. A method for routing a distribution cable into a channel in a concrete or asphalt substrate, the method comprising:
simultaneously milling the channel and a recessed area, wherein the channel has a channel width that is narrower than a width of the recessed area and a channel depth that is greater than a depth of the recessed area;
placing the distribution cable into the channel;
applying a cabling tape into the recessed area to cover the cable and channel, wherein an upper surface of the tape is substantially flush with or slightly below a top surface of the substrate;
applying a bonding agent to the recessed area before applying the tape; and
pressing the tape into the bonding agent to bond the tape to the substrate.

2. The method of claim 1, further comprising:
providing a device for placing the distribution cable into the channel, wherein the device comprises a distribution cable housing and distribution portion that houses a spool of the distribution cable; and
moving the device in one direction such that the device positions the distribution cable into the channel at a predetermined location.

3. The method of claim 2, wherein a cabling tape housing and distribution portion houses a spool of cabling tape having an adhesive capable of adhering to the concrete or asphalt substrate, and wherein moving the device in one direction also positions the cabling tape into the recessed area at the predetermined location.

4. The method of claim 2, wherein the device further comprises an endoscope camera, the method further comprising:
viewing images from the endoscope camera of the predetermined location during insertion of the distribution cable into the channel.

5. The method of claim 4, further comprising:
providing an endoscope control unit and connecting the endoscope camera to the endoscope control unit.

6. The method of claim 5, wherein the device further comprises a user interface, the method further comprising:
controlling the endoscope camera and viewing images provided by the endoscope camera via the user interface.

7. The method of claim 6, wherein the user interface is a cell phone that communicates wirelessly with the endoscope control unit.

8. The method of claim 1, further comprising:
providing a pavement grinder for simultaneously milling the channel and the recessed area, wherein the pavement grinder comprises a blade axle.

9. The method of claim 8, further comprising:
prior to simultaneously milling the channel and the recessed area, mounting a channel blade to be centered on the blade axle and at least one milling blade on each side of the channel blade.

10. The method of claim 9, wherein the channel blade is a diamond tipped channel blade.

11. The method of claim 9, wherein the channel blade has a larger diameter than a diameter of the at least one milling blade on each side of the channel blade.

* * * * *